United States Patent [19]

Itoh et al.

[11] 3,969,310

[45] July 13, 1976

[54] SILICONE RUBBER COMPOSITIONS

[75] Inventors: Kunio Itoh; Naohiko Harada; Masaki Tanaka, all of Annaka, Japan

[73] Assignee: Shin-Etsu Chemical Co., Ltd., Tokyo, Japan

[22] Filed: Aug. 21, 1975

[21] Appl. No.: 606,345

[30] Foreign Application Priority Data

Aug. 29, 1974 Japan.............................. 49-99286

[52] U.S. Cl. .................... 260/37 SB; 260/46.5 UA; 260/46.5 G
[51] Int. Cl.² ........................................ C08L 83/04
[58] Field of Search................ 260/46.5 UA, 46.5 G, 260/37 SB

[56] References Cited
UNITED STATES PATENTS

| | | | |
|---|---|---|---|
| 2,867,606 | 1/1959 | Gilbert............................ | 260/46.5 G |
| 3,440,205 | 4/1969 | Chadha et al.............. | 260/46.5 G X |
| 3,876,605 | 4/1975 | Itoh et al......................... | 260/37 SB |

*Primary Examiner*—Lewis T. Jacobs
*Attorney, Agent, or Firm*—Toren, McGeady and Stanger

[57] ABSTRACT

Silicone rubber compositions consisting essentially of an organopolysiloxane containing in a molecule at least one linearly-linked cyclic siloxane unit and at least two alkenyl groups directly bonded to silicon atoms, an organohydrogenpolysiloxane, and a platinum catalyst. These compositions are cured to form solid elastomers which exhibit a very low permeability to water vapor, and are useful for enclosing electronic units.

11 Claims, No Drawings

SILICONE RUBBER COMPOSITIONS

FIELD OF THE INVENTION

This invention relates to silicone rubber compositions convertible to the cured or vulcanized, solid, elastic state which when cured exhibit a very low permeability to water vapor.

DESCRIPTION OF THE PRIOR ART

Various known silicone rubbers, such as, the most common dimethyl silicone rubber obtained by curing dimethylpolysiloxane gum, have high permeability to gases and vapors, compared to other synthetic rubbers, natural rubber, and plastics. Those silicone rubbers therefore are not suitable for certain applications, particularly for covering or encapsulating electronic units or assemblies, metallic articles, and the like, which should be protected from water vapor permeation.

On the other hand, some known siloxanes are capable of forming silicone rubbers having a low vapor permeability. Examples include orgaopolysiloxanes containing a silphenylene linkage and organopolysilsesquioxanes. However these siloxanes all remain solid at room temperature, and can not be used in the making of room temperature vulcanizing silicone rubber formulations applicable to potting or dipping.

OBJECT OF THE INVENTION

It is the general object of this invention to introduce a novel silicone rubber composition which in the cured, solid, elastic state exhibits a very low permeability to water vapor.

SUMMARY OF THE INVENTION

This invention provides a novel silicone rubber composition consisting essentially of (a) an organopolysiloxane containing in a molecule at least two alkenyl groups directly bonded to silicon atoms and at least one linearly-linked cyclic siloxane unit represented by the formula

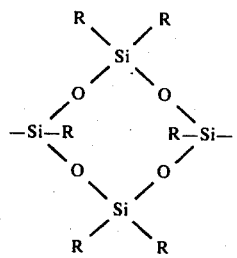
(I)

where each R, which may be identical or different, is a substituted or unsubstituted monovalent hydrocarbon group, (b) an organohydrogenpolysiloxane represented by the average formula

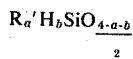
(II)

where R' is same as R above, a is 1 to 2, and b is 0.2 to 1.2 with the proviso that (a + b) is 1.8 to 3.0, and having at least two hydrogen atoms per molecule directly bonded to silicon atoms, in an amount sufficient to provide from 0.8 to 2.5 hydrogen atoms directly bonded to silicon atoms for each alkenyl group present in component (a) above, and (c) a catalytic amount of platinum or a platinum compound.

DETAILED DESCRIPTION OF THE INVENTION

The straight-chain organopolysiloxane which is component (a) in the composition of the present invention is one whose molecules must have, per molecule, at least one siloxane unit of the above-mentioned formula (I) and at least two alkenyl groups bonded directly to silicon atoms. The substituted or unsubstituted monovalent hydrocarbon groups represented by R in Formula (I) are alkyl groups, such as, methyl, ethyl, and propyl, alkenyl groups, such as, vinyl and allyl, or aryl groups, such as, phenyl. They may be identical or different to each other.

Typical molecular structures of the organopolysiloxane component (a) of the present invention are composed of the individual cyclic siloxane units of Formula (I) linked by divalent groups which are selected from the following expressions.

(1)

(2)

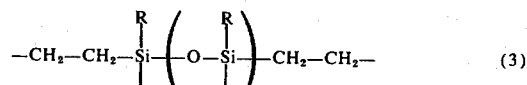
(3)

(4)

In the above expressions, R has the same meaning as defined previously, $l$ is an integer of at least 2, and $m$ and $n$ are integers having a value of at least 1.

Further, the organopolysiloxane component (a) in the compositions of the invention is terminated by one of the end-blocking groups, the preferred examples of which are expressed as follows.

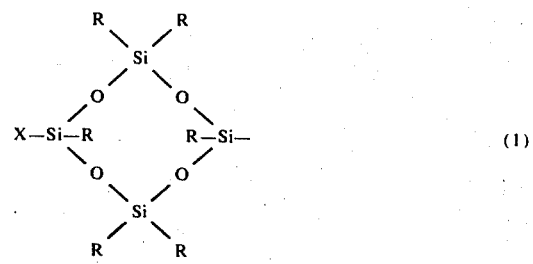
(1)

(2)

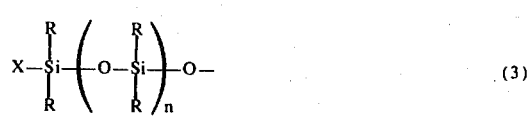
(3)

In the above expressions, X is a monovalent hydrocarbon group, preferably an alkenyl group and R, $l$ and $n$ are all as defined above.

The organopolysiloxane component (a) in the compositions of the invention may be prepared by reacting a cyclic organopolysiloxane represented by the general formula

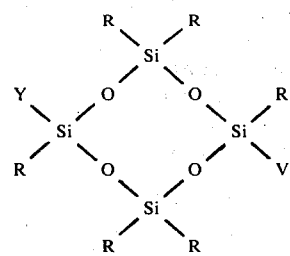
(III)

where R is as defined previously, Y is a functional atom or group selected from the class consisting of hydrogen, chlorine, hydroxy, alkenyl, OR', —NR''$_2$ and

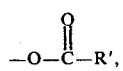

where R' is a monovalent hydrocarbon group, and R'' is hydrogen or a monovalent hydrocarbon group, with a cyclic organopolysiloxane represented by the general formula

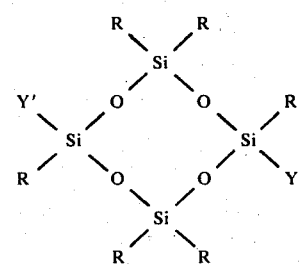
(IV)

where R is as defined above and Y' has the same meaning as the above-mentioned Y, or a straight-chain organopolysiloxane represented by the general formula $$Y''-\underset{R}{\overset{R}{Si}}-\left(O-\underset{R}{\overset{R}{Si}}\right)_{m'}-Y''$$ (V)

where R is as defined above, Y'' has the same meaning as the above-mentioned Y, and $m'$ is a positive integer, in accordance with conventional methods that involve forming siloxane or silalkylene linkages. For example, it is possible to carry out addition reaction or dehydrogenation by choosing an alkenyl group or a hydroxy group, respectively, for Y' in Formula (IV) and Y'' in Formula (V) when Y in Formula (III) is always a hydrogen atom. For a further example, dehydrogenation, dehydration, dehydrochlorination, dealcoholization, deamination, or decarboxylation can be carried out by choosing a hydrogen atom, a hydroxy group, a chlorine atom, —OR', —NR''$_2$, or

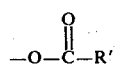

(where R' and R'' are the same as defined previously), respectively, for Y' in Formula (IV) and Y'' in Formula (V), when Y in Formula (III) is always a hydroxy group.

It should be added that at least 50 mole % of the monovalent hydrocarbon groups represented by R in Formula (I) are preferably occupied by methyl groups and that the positions at which the alkenyl groups should be situated are not particularly limited but, preferably, at the chain ends, insofar as they are at least two in number per molecule. Furthermore, the values of $m$ and $n$ in some of the divalent groups are preferably 5 1 or less, since any values exceeding 5 have a tendency to cause a greater moisture permeability in the resulting compositions, and thereby fail to achieve the objects of this invention.

The following formulas, are examples for the abovedescribed organopolysiloxane component (a). In the formulas p is a positive integer of at least 1.

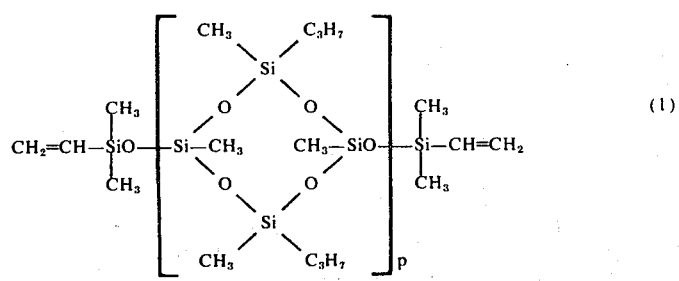
(1)

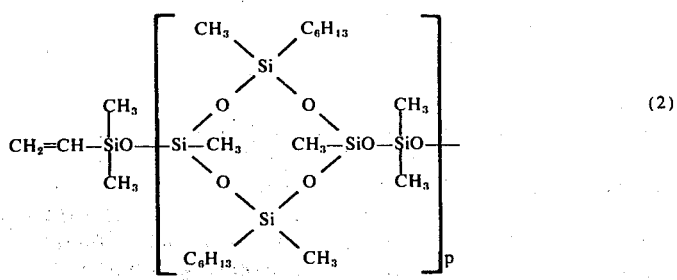
(2)

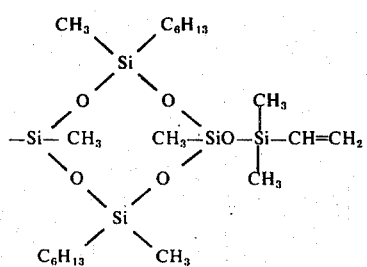
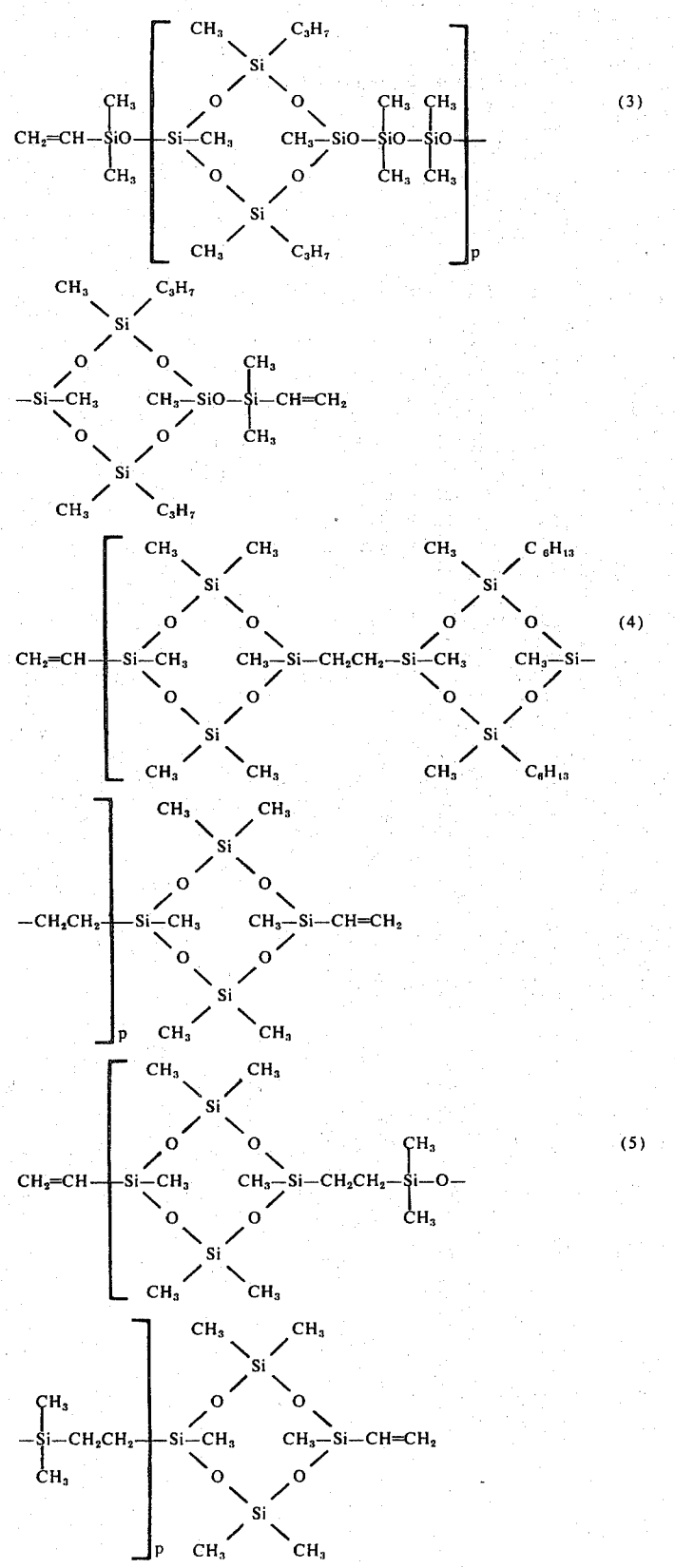

The organopolysiloxane component (a) in accordance with the invention can have a viscosity in an unlimited range. However, when used for potting, embedding or encapsulation in which fluidity is required, it is preferred that the organopolysiloxane component (a) has a viscosity not exceeding 100,000 cS at 25°C.

Next, the organohydrogenpolysiloxane component (b) represented by Formula (II) is required to contain at least two hydrogen atoms bonded to silicon atoms per molecule. The monovalent hydrocarbon groups represented by R' in Formula (II) may be substituted or unsubstituted monovalent hydrocarbon groups including alkyl groups, such as, methyl, ethyl and propyl, alkenyl groups, such as, vinyl and allyl, and aryl groups, such as, phenyl.

Illustrative of these organohydrogenpolysiloxanes are diorganopolysiloxanes terminated by dimethylhydrogensilyl groups at both ends of their molecular chains, copolymers of dimethylsiloxane and methylhydrogensiloxane units terminated by trimethylsiloxy groups, low-viscosity fluids composed of dimethylhydrogensiloxane and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane. They may be of either straight chain, branched chain or cyclic structure. Preferably, component (b) is a straight chain or linear organohydrogenpolysiloxane comprising methylhydrogensiloxane units.

The amount of the above organohydrogenpolysiloxane component (b) that is blended with component (a) must be an amount sufficient to provide from 0.8 to 2.5 hydrogen atoms bonded to silicon atoms for each alkenyl group present in component (a).

The third component (c) which is platinum or a platinum compound, is used for the purpose of accelerating addition reactions between components (a) and (b). The examples of the platinum compounds are well known chloroplatinic acid, complexes of chloroplatinic acid with alcohols, ethers or aldehydes, and coordination compounds of platinum. The amount of component (c) used in the compositions of the invention is a catalytic amount, say, ranging from about 1 to about 500 p.p.m. by weight as platinum based on the weight of the total of components (a) and (b). This amount, however, may be adjustable more or less depending on the reactivities of components (a) and (b) and the desired curing rates of the resulting compositions.

While the composition of the present invention can be prepared by merely blending components (a), (b) and (c) together as set forth above in any desired fashion, it is most convenient for purposes of storage stability to keep these components in two packages which will be combined just prior to use. In this case, it is preferred to include components (a) and (c) in the first package, and the other sole component (b) in the second package.

The silicone rubber compositions in accordance with the present invention can have a remarkably improved fluidity. They are readily curable at moderate temperature, say, between room temperature and about 150°C to produce a silicone elastomer having a low permeability to water vapor and a good resistance to water.

When the compositions have a high fluidity, they can be useful particularly as an encapsulating material to enclose an electric assembly or unit, and the cured composition provides good electrical insulation and protection of the encapsulated units from environmental attacks.

In addition to the above-described components (a), (b) and (c), the compositions of the present invention may contain any of the following inorganic fillers as a reinforcing or non-reinforcing filler. Silicious fillers, such as, finely divided quartz or fused quartz powder, hydrated silica, silica aerogel, hydrated calcium silicate and hydrated aluminum silicate, oxides of metals, such as, titanium dioxide, aluminum oxide, zinc oxide and iron oxide, other inorganic materials, such as, carbon black, graphite, calcium carbonate, mica flour and clay, and fibrous materials from glass, asbestos, and carbon. The addition of these fillers is also advantageous with a view to further reducing the vapor permeability for the purpose of the present invention. They can be employed in an amount as large as possible, provided that no adverse effects are incurred. For example, finely divided quartz may be employed in an amount up to 250 parts by weight per 100 parts by weight of component (a).

It is also possible to add other additives exemplified by pigments, heat-stability improvers, flame retardants and oxidation inhibitors, if necessary.

The following examples are illustrative of the present invention and not intended for purposes of limitation. In the examples, parts are all parts by weight, and the permeability expressed in "$g.mm/m^2.24$ hrs." showing the rate of flow of water vapor through each test sheet was determined as follows. The amount (g) of water vapor passing through unit area ($m^2$) of the test sheet within 24 hours was divided by the thickness (mm) of the test sheet, while the test sheet was kept at 40°C with one side of it being exposed to an atmosphere having a relative humidity of 90% and the other side to air dried by anhydrous calcium chloride. The measuring procedures are described in JIS (Japanese Industrial Standard) Z 0208.

EXAMPLE 1

An organopolysiloxane of the following molecular formula, in which p had an average value of 12.33, was prepared by the following.

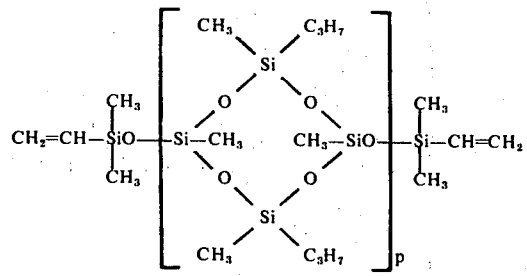

135 g (0.34 mole) of 1,5-dichloro-3,7-dipropyl-1,3,5,7-tetramethylcyclotetrasiloxane were added dropwise with stirring to a mixture consisting of 142 g (0.4 mole) of 1,5-dihydroxy-3,7-dipropyl-1,3,5,7-tetramethylcyclotetrasiloxane, 70 g (0.89 mole) of pyridine and 700 g of toluene contained in a 2-liter flask. After the resulting mixture was stirred at room temperature for 5 hours, 15 g (0.125 mole) of dimethylvinylchlorosilane were added dropwise with stirring, followed by stirring for an additional 3 hours. The resulting solution was treated to remove pyridine in the form of hydrochloric acid salt and any pyridine remaining unreacted by washing with water, then toluene by distillation and to finally remove all volatile matter by heating at 150°C under a 3-mmHg pressure for 3 hours. The intended fluid organopolysiloxane thus obtained had a viscosity of 1,600 cS at 25°C.

To 100 parts of the above organopolysiloxane were added 150 parts of finely divided quartz having an average particle size of 15 $\mu$m, 4.5 parts of a trimethylsilyl chain-stopped methylhydrogenpolysiloxane having a viscosity of 30 cS at 25°C and 0.2 part of a chlorolatinic acid solution in octyl alcohol having a concentration of 2% as platinum and this uniformly mixed together. The fluid composition thus obtained was poured in a flat tray kept in a horizontal position, and heated at 100°C for 1 hour to produce a 2-mm thick sheet. The permeability of this silicone rubber sheet was 12 g.mm/m².24 hrs.

Separately, the procedure described in the above paragraph was repeated with the exception that instead of 4.5 parts of a trimethylsilyl chain-stopped methylhydrogenpolysiloxane having a viscosity of 30 cS at 25°C, 12 parts of a trimethylsilyl chain-stopped organopolysiloxane copolymer consisting of 40 mole percent $(CH_3)HSiO$ units and 60 mole percent $(CH_3)_2SiO$ units, having a viscosity of 90 cS at 25°C, was used, to produce a silicone rubber sheet 2 mm thick. The permeability of this silicone rubber sheet was 16 g.mm/m².24 hrs.

For comparative purposes, a similar procedure was repeated with the alteration that instead of the organopolysiloxane and the methylhydrogenpolysiloxane or the organopolysiloxane copolymer, 100 parts of a dimethylpolysiloxane of the molecular formula

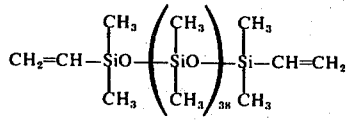

having a viscosity of 60 cS at 25°C and 6.5 parts of a trimethylsilyl chain-stopped methylhydrogenpolysiloxane having a viscosity of 30 cS at 25°C, respectively, were used, to produce a silicone rubber sheet 2 mm thick. The permeability of this silicone rubber sheet was 53 g.mm/m².24 hrs.

As a further comparative example, a test was conducted, using the same organopolysiloxane copolymer as mentioned previously in place of the methylhydrogenpolysiloxane. The resulting silicone rubber sheet showed a permeability of 56 g.mm/m².24 hrs.

EXAMPLE 2

An organopolysiloxane of the same molecular formula as in Example 1 but with the value of $p$ not determined experimentally was prepared by the following procedure. 157.2 g (0.4 mole) of 1,5-dichloro-3,7-dipropyl-1,3,5,7-tetramethylcyclotetrasiloxane were added dropwise with stirring to a mixture consisting of 142 g (0.4 mole) of 1,5-dihydroxy-3,7-dipropyl-1,3,5,7-tetramethylcyclotetrasiloxane, 70 g (0.89 mole) of pyridine and 600 g of toluene contained in a 2-liter flask. After the resulting mixture was stirred at room temperature for 10 hours, 15 g (0.125 mole) of dimethylvinylchlorosilane were added, followed by stirring for additional 5 hours. The resulting solution was washed with water and heated at 150°C under a 3-mmHg pressure for 3 hours to remove all volatile matter. The intended organopolysiloxane thus obtained had a viscosity of 520,000 cS at 25°C.

To 100 parts of the above organopolysiloxane were added 150 parts of finely divided quartz having an average particle size of 15 $\mu$m, 2 parts of a trimethylsilyl chain-stopped methylhydrogenpolysiloxane having a viscosity of 30 cS at 25°C and 0.2 part of a chloroplatinic acid solution in octyl alcohol having a concentration of 2% as platinum, and these were uniformly mixed together. The composition thus obtained was passed through a calendar roll to produce a 2-mm thick sheet, which was then cured at 100°C for 1 hour in an air oven. The permeability of this rubber sheet was 13 g.mm/m².24 hrs.

EXAMPLE 3

An organopolysiloxane of the following molecular formula in which $p$ had an average value of about 20 was prepared by the following procedure.

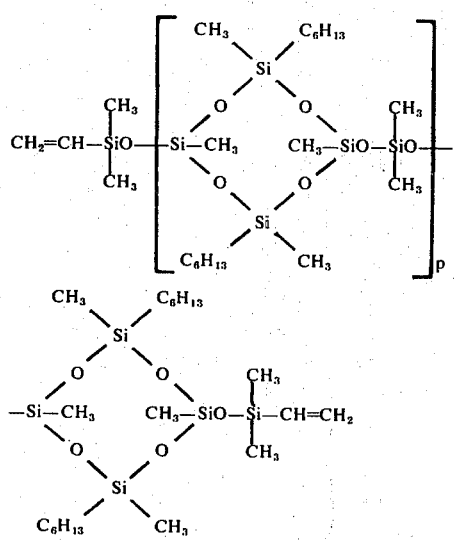

A mixture consisting of 220 g (0.5 mole) of 1,5-dihydroxy-3,7-dihexyl-1,3,5,7-tetramethylcyclotetrasiloxane, 69 g (0.475 mole) of bis(dimethylamino)-dimethylsilane and 440 g of toluene contained in a 1-liter flask were stirred at room temperature for 3 hours and then any residual amine as removed in the course of heating up to the reflux temperature of toluene. The resulting solution was admixed with 6 g of pyridine and then with 8 g of dimethylvinylchlorosilane dropwise, followed by stirring at room temperature for 3 hours. Thereupon, the solution was washed with water and then toluene was removed by distillation and the volatile matter was also removed by heating at 150°C under a 3-mmHg pressure for 3 hours. The intended fluid organopolysiloxane thus obtained had a viscosity of 1,200 cS was 25°C.

To 100 parts of the above organopolysiloxane were added 150 parts of finely divided quartz having an average particle size of 15 $\mu$m, 2 parts of a trimethylsilyl chain-stopped methylhydrogenpolysiloxane having a viscosity of 30 cS at 25°C and 0.2 part of a chloroplatinic acid solution in octyl alcohol having a concentration of 2% as platinum, and these were uniformly mixed together. The fluid siloxane composition thus obtained was poured in a flat tray kept in a horizontal position, and heated at 100°C for 1 hour to produce a 2-mm thick sheet having a rubber-like elasticity. Its permeability was 14 g.mm/m².24 hrs.

EXAMPLE 4

An organopolysiloxane of the following molecular formula in which $p$ had an average value of about 24 was prepared by the following.

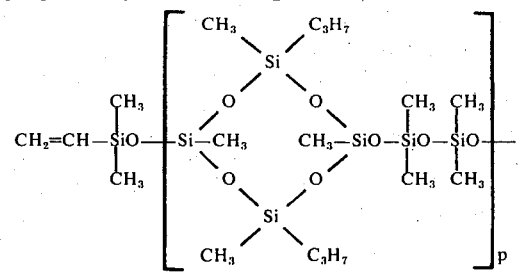

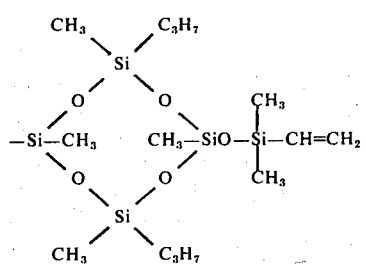

A mixture consisting of 89 g (0.25 mole) of 1,5-dihydroxy-3,7-dipropyl-1,3,5,7-tetramethylcyclotetrasiloxane, 45 g of pyridine and 300 g of toluene contained in a 1-liter flask was stirred at room temperature for 5 hours, while adding dropwise with stirring 49 g (0.24 mole) of 1,3-dichloro-1,1,3,3-tetramethyldisiloxane. After the resulting mixture was subjected to stirring at room temperature for an additional 5 hours, 3.5 g of dimethylvinylchlorosilane were added dropwise, followed by stirring, at room temperature for 3 hours.

Thereupon, the solution was washed with water, to remove toluene by distillation and volatile matter by heat at 150°C under a 3-mmHg pressure. The fluid thus obtained had a viscosity of 650°C at 25°C.

To 100 parts of the above organopolysiloxane were added 150 parts of finely divided quartz having an average particle size of 15 $\mu$m, 2 parts of a trimethylsilyl chain-stopped methylhydrogenpolysiloxane having a viscosity of 30 cS at 25°C and 0.2 part of a chloroplatinic acid solution in octyl alcohol having a concentration of 2% as platinum, and these were uniformly mixed together. The fluid composition thus obtained was poured in a flat tray kept in a horizontal position, and heated at 100°C for 1 hour to produce a 2-mm thick sheet. The permeability of this silicone rubber sheet was 16 g.mm/m².24 hrs.

EXAMPLE 5

An organopolysiloxane of the following molecular formula in which $p$ had an average value of about 4 was prepared by the following.

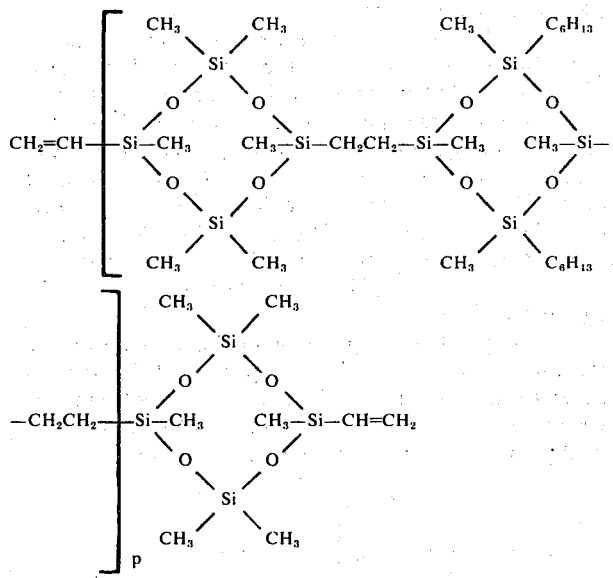

A mixture consisting of 64 g (0.2 mole) of 1,5-divinyl-1,3,3,5,7,7-hexamethylcyclotetrasiloxane, 66 g (0.16 mole) of 1,5-dihydrogen-3,7-dihexyl-1,3,5,7-tetramethylcyclotetrasiloxane and 0.05 g of a chloroplatinic acid solution in octyl alcohol having a concentration of 2% as platinum contained in a 300 -ml flask was stirred at 50°C for 3 hours, followed by further stirring at an elevated temperature of 120°C for 10 hours, to produce the intended fluid organopolysiloxane, which had a viscosity of 145 cS at 25°C.

To 100 parts of the above organopolysiloxane were added 150 parts of finely divided quartz having an average particle size of 15 $\mu$m, 5.5 parts of a trimethylsilyl chain-stopped methylhydrogenpolysiloxane having a viscosity of 30 cS at 25°C and 0.1 part of a chloroplatinic acid solution in octyl alcohol having a concentration of 2% as platinum and these were uniformly mixed together. The fluid composition thus obtained was poured in a flat tray kept in a horizontal position, and heated at 100°C for 1 hour to produce a 2-mm thick sheet having a rubber-like elasticity. Its permeability was 9 g.mm/m².24 hrs.

EXAMPLE 6

An organopolysiloxane expressed by the following molecular formula in which $p$ had an average value of about 19 was prepared by the procedure to follow.

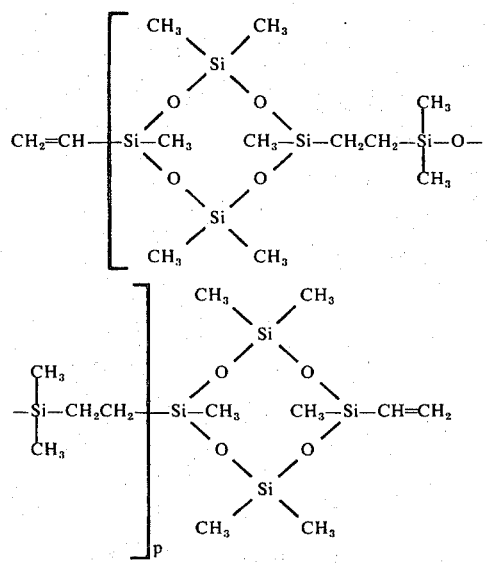

A mixture consisting of 64 g (0.2 mole) of 1,5-divinyl-1,3,3,5,7,7-hexamethylcyclotetrasiloxane, 26.8 g (0.19 mole) of 1,1,3,3-tetramethyldisiloxane, and 0.05 g of a chloroplatinic acid solution in octyl alcohol having a concentration of 2% as platinum contained in a 200-ml flask was stirred at 50°C for 3 hours, followed by further stirring at an elevated temperature of 120°C for 10 hours, to produce the intended organopolysiloxane which was clear, yellow and had a viscosity of 940 cS at 25°C.

To 100 parts of the above organopolysiloxane were added 150 parts of finely divided quartz having an average particle size of 15 μm, 2.2 parts of a trimethylsilyl chain-stopped methylhydrogenpolysiloxane having a viscosity of 30 cS at 25°C and 0.1 part of a chloroplatinic acid solution in octyl alcohol having a concentration of 2% as platinum, and these were uniformly mixed together. The fluid composition thus obtained was poured in a flat tray kept in a horizontal position, and heated at 100°C for 1 hour to produce a 2-mm thick sheet. The permeability of this silicone rubber sheet was 12 g.mm/m².24 hrs.

For comparative purposes, a linear organopolysiloxane was prepared from 1,3-divinyl-1,1,3,3-tetramethyldisiloxane and 1,1,3,3-tetramethyldisiloxane, using 55.8 g (0.3 mole) of the former, 40.2 g (0.285 mole) of the latter and 0.05 g of a chloroplatinic acid solution in octyl alcohol having a concentration of 2% as platinum under the same manner and conditions. The organopolysiloxane fluid thus obtained was clear, yellow and had a viscosity of 320 cS at 25°C. Then, with this organopolysiloxane, a test sheet 2 mm thick was produced by a similar procedure. The sheet was found to have a permeability of 25 g.mm/m².24 hrs.

What is claimed is:

1. A silicone rubber composition consisting essentially of (a) an organopolysiloxane containing in a molecule at least two alkenyl groups directly bonded to silicon atoms and at least one linearly-linked cyclic siloxane unit represented by the formula

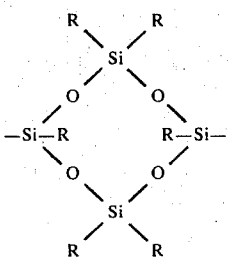

where each R which may be identical or different, and is a substituted or unsubstituted monovalent hydrocarbon group, (b) an organohydrogenpolysiloxane represented by the average formula $$R_a'H_bSiO_{\frac{4-a-b}{2}}$$

where R' is same as R above, $a$ is 1 to 2, and $b$ is 0.2 to 1.2 with the proviso that $(a + b)$ is 1.8 to 3.0, and having at least two hydrogen atoms directly bonded to silicon atoms per molecule, in an amount enough to provide from 0.8 to 2.5 hydrogen atoms directly bonded to silicon atoms for each alkenyl group present in component (a) above, and (c) a catalytic amount of platinum or a platinum compound.

2. The silicone rubber composition as claimed in claim 1 wherein said monovalent hydrocarbon group denoted by R is an alkyl group.

3. The silicone rubber composition as claimed in claim 1 wherein component (a) is an organopolysiloxane expressed by the formula

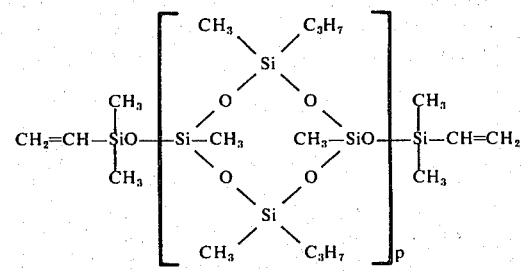

where $p$ is a positive integer of at least 1.

4. The silicone rubber composition as claimed in claim 1 wherein component (a) is an organopolysiloxane expressed by the formula

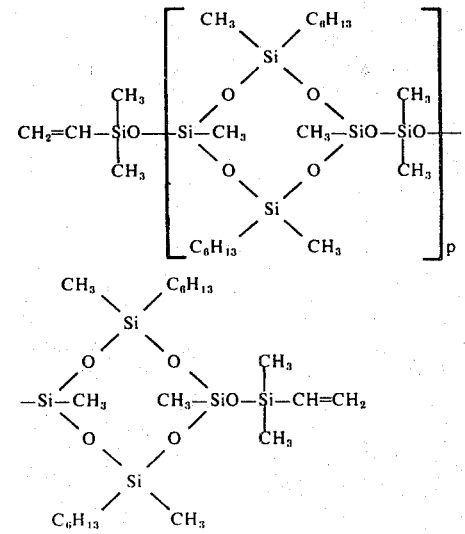

where p is a positive integer of at least 1.

5. The silicone rubber composition as claimed in claim 1 wherein component (a) is an organopolysiloxane expressed by the formula

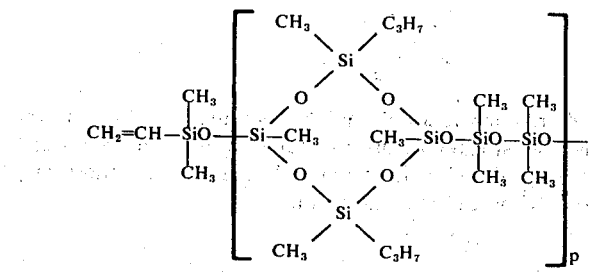

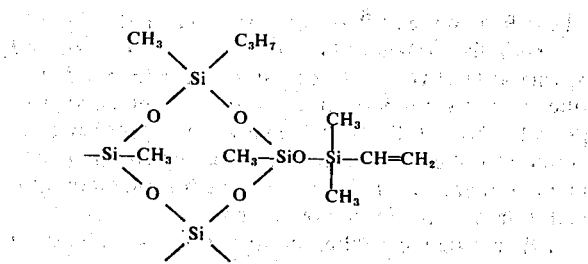

where p is a positive integer of at least 1.

6. The silicone rubber composition as claimed in claim 1 wherein component (a) is an organopolysiloxane expressed by the formula

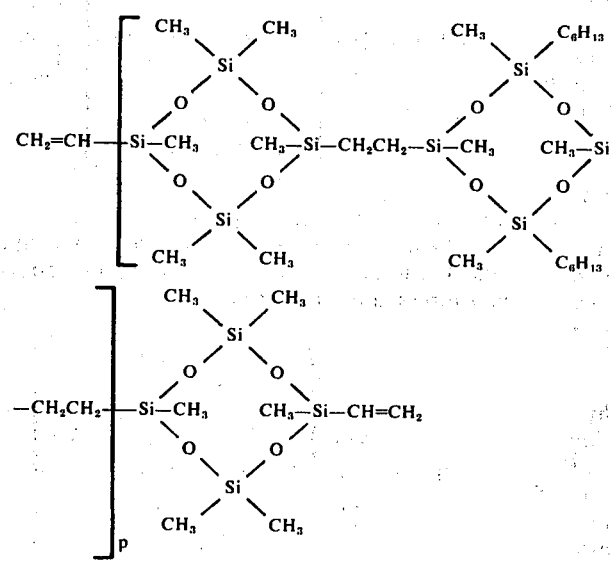

where p is a positive integer of at least 1.

7. The silicone rubber composition as claimed in claim 1 wherein component (a) is an organopolysiloxane expressed by the formula

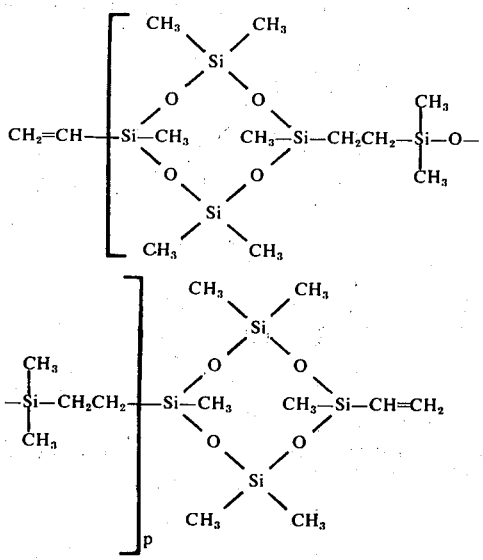

where p is a positive integer of at least 1.

8. The silicone rubber composition as claimed in claim 1 wherein component (b) is a linear organohydrogenpolysiloxane comprising a plurality of methylhydrogenpolysiloxane units.

9. The silicone rubber composition as claimed in claim 1 which additionally includes an inorganic filler.

10. The silicone rubber composition as claimed in claim 9 wherein said inorganic filler is finely divided quartz.

11. The silicone rubber composition as claimed in claim 10 wherein said finely divided quartz is present in an amount of from 100 to 250 parts by weight per 100 parts by weight of component (a).

* * * * *